United States Patent [19]

DiRocco et al.

[11] Patent Number: 4,548,102
[45] Date of Patent: Oct. 22, 1985

[54] HOLE FILLING SYSTEM FOR TIRES

[76] Inventors: Jobbie DiRocco, 3424 Sweetbriar Ave., Akron, Ohio 44321; David J. DiRocco, 7090 Grove Rd., Clinton, Ohio 44216

[21] Appl. No.: 565,916

[22] Filed: Dec. 27, 1983

[51] Int. Cl.⁴ .......................................... B60C 25/16
[52] U.S. Cl. ................................... 81/15.7; 152/370; 156/97
[58] Field of Search ............... 81/15.7, 15.2, 15.5; 156/97; 152/370

[56] References Cited

U.S. PATENT DOCUMENTS

| | | |
|---|---|---|
| 495,454 | 4/1893 | Cummings et al. |
| 864,226 | 8/1907 | Blodgett ............................. 81/15.7 |
| 1,269,922 | 6/1918 | Gadecki. |
| 1,348,005 | 7/1920 | Hirst ................................. 81/15.7 |
| 1,676,425 | 7/1928 | Chapman. |
| 2,828,657 | 4/1958 | Fromberg ........................... 81/15.7 |
| 2,828,791 | 4/1958 | Fromberg ........................... 152/370 |
| 2,928,300 | 3/1960 | Rodgers ............................. 81/15.6 |
| 2,931,261 | 4/1960 | Crandall ............................ 81/15.7 |
| 2,956,460 | 10/1960 | Nowotny ........................... 81/15.5 |
| 3,122,951 | 3/1964 | Berg ................................. 81/15.7 |
| 3,310,095 | 3/1967 | Klune ................................ 152/370 |
| 3,400,445 | 9/1968 | Crandall et al. ..................... 81/15.7 |
| 3,542,614 | 11/1970 | Hopkins ............................. 81/15.7 |

FOREIGN PATENT DOCUMENTS 2204089 10/1972 Fed. Rep. of Germany ....... 81/15.5

Primary Examiner—Roscoe V. Parker
Attorney, Agent, or Firm—Frederick K. Lacher

[57] ABSTRACT

A tool tip is inserted from the inside of the tire into a hole in a tire crown by turning the tool tip as it is pressed against the tire. The tool tip is mounted on a hollow tool having a cylindrical insert receiving chamber. An insert is pushed by a plunger out of the receiving chamber in the hollow tool through a tapered portion into a compression chamber in the tool tip. The compression chamber has a diameter smaller than the diameter of the insert so that when the insert is ejected from the hollow tool it will expand to fill the hole in the tire. The insert is also tapered to engage the tapered portion between the receiving and compression chambers. The plunger has a plunger head with a substantially flat pushing surface and knurled edges which the operator can manually grip and push. The outside of the hollow tool is also shaped for manual gripping to turn the hollow tool and tool tip in the same direction during insertion and removal of the tool tip from the tire to leave an undamaged insert in the hole.

12 Claims, 7 Drawing Figures

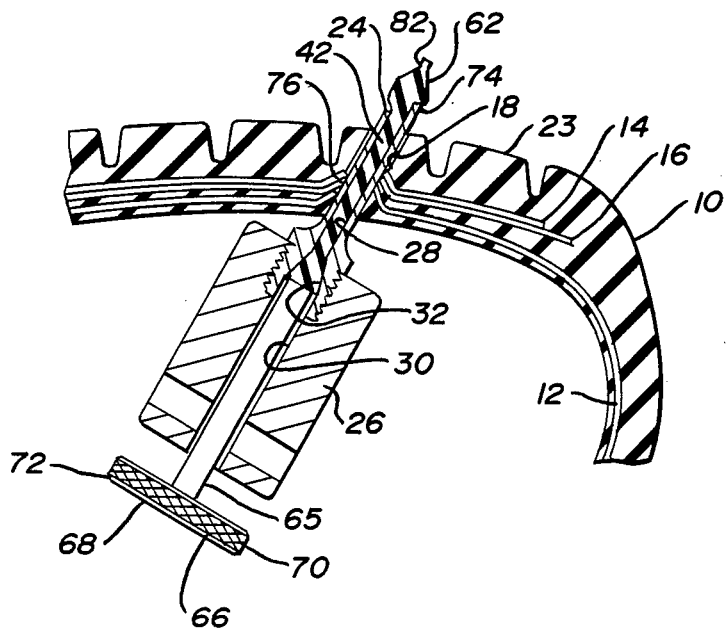
FIG. 3
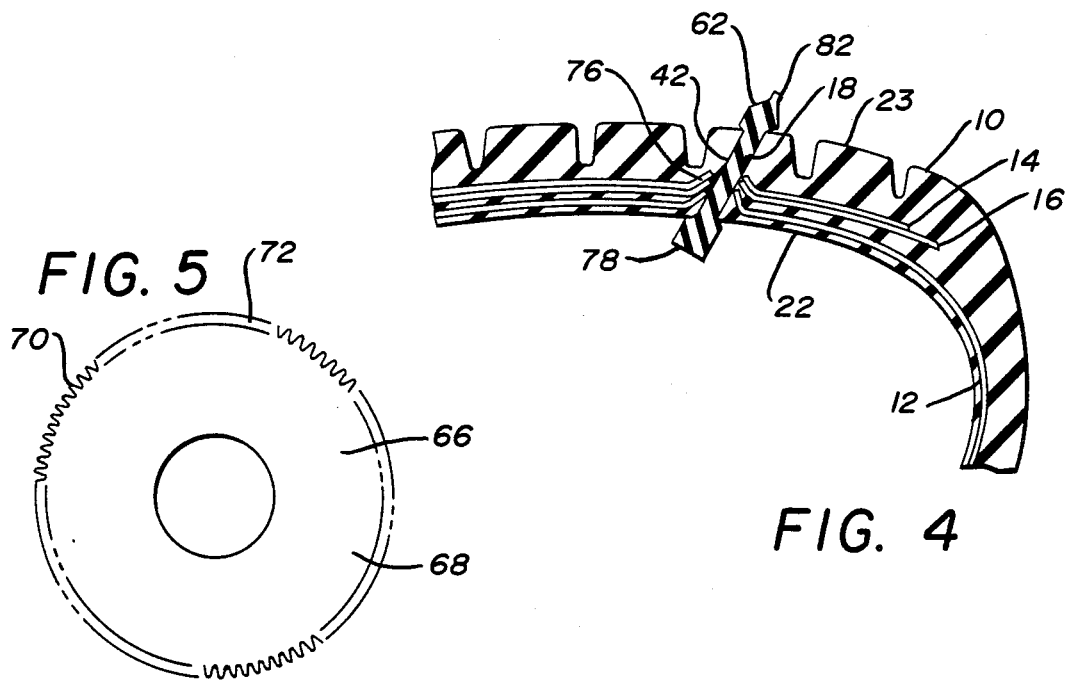
FIG. 5
FIG. 4
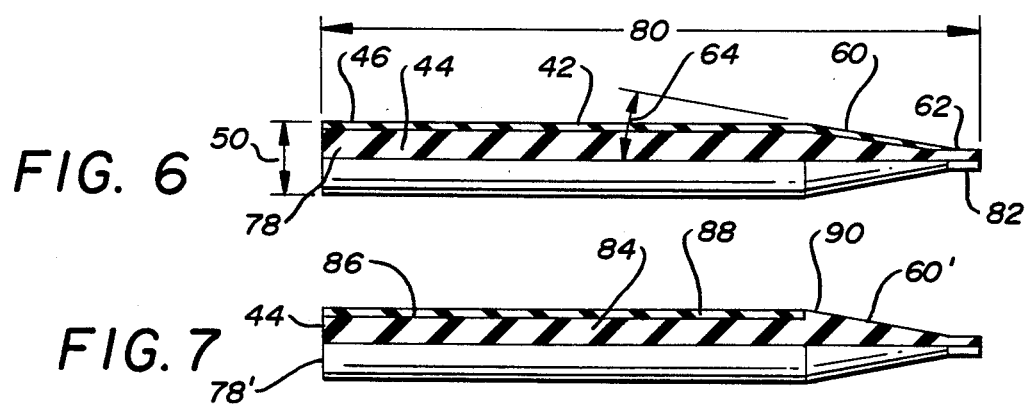
FIG. 6
FIG. 7

HOLE FILLING SYSTEM FOR TIRES

This invention relates to repairing tires which have injuries caused by sharp objects such as nails penetrating the tire walls. The system of this invention is especially desirable for filling holes in the crown portion of radial truck tires before patches are installed over the injuries.

It has been the practice to fill holes in tires with butterfly inserts or strips of rubber which are hooked by a buttonhook tool pushed through the holes and then pulled back after hooking the inserts to plug the holes. This system has not provided the desired filling and sealing of the holes and the labor costs have been high due to breaking of the inserts. Plugs have been inserted from the outside of a wire reinforced tire, however, the broken ends of the wires are bent inwardly and have punctured the patches placed over the injuries on the inner surface of the tire.

The insertion of plugs into holes in tires has been practiced heretofore to repair punctures; however, in most cases the plugs have been inserted from the outside of the tire. Equipment used heretofore for inserting plugs from the outside of the tire is not satisfactory for inserting plugs from the inside of the tire where the space is limited and the holes in the tires may be at many different angles.

In accordance with the system of the present invention a relatively compact small manual tool operable with one hand is utilized to insert a tapered insert from the inside of the tire into the holes in the crown portion of the tire at substantially any angle. By inserting the plugs from the inside, reinforcing wires are bent outwardly and do not damage the patches. The system is especially desirable for wire reinforced tires in that the tool has a tip which is rotated in one direction as it is inserted in the tire and then rotated in the same direction when it is removed from the tire. This sets the damaged wires so that they do not cut the insert when the tool is removed from the tire.

In accordance with one aspect of the invention there is provided a system for repairing a tire in which an elongated cylindrical insert of resilient material is positioned, under compression, in a hole extending from an inner surface to an outer surface of the tire by pushing a tool tip containing a cylindrical compression chamber of lesser diameter than the insert through the hole, pushing the insert into the compression chamber of the tool tip a sufficient distance so that a forward end of the insert extends beyond the end of the tool tip and beyond the outer surface of the tire, and pulling the tool tip out of the hole leaving the insert in the hole wherein the insert comprises a cylindrical portion and a tapered portion located at the forward end for reducing the force necessary to push the insert into the compression chamber of the tool tip.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

In the drawings:

FIG. 3 is a sectional view like FIG. 2 showing the insert injecting tool after injection of the insert into the hole.

FIG. 4 is a sectional view like FIG. 3 after removal of the insert injecting tool from the hole.

FIG. 5 is an enlarged view of the plunger head taken along the line 5—5 in FIG. 2.

FIG. 6 is an enlarged, half sectional view of the insert.

FIG. 7 is an enlarged, half sectional view of an insert having a modified construction.

Figure 1:
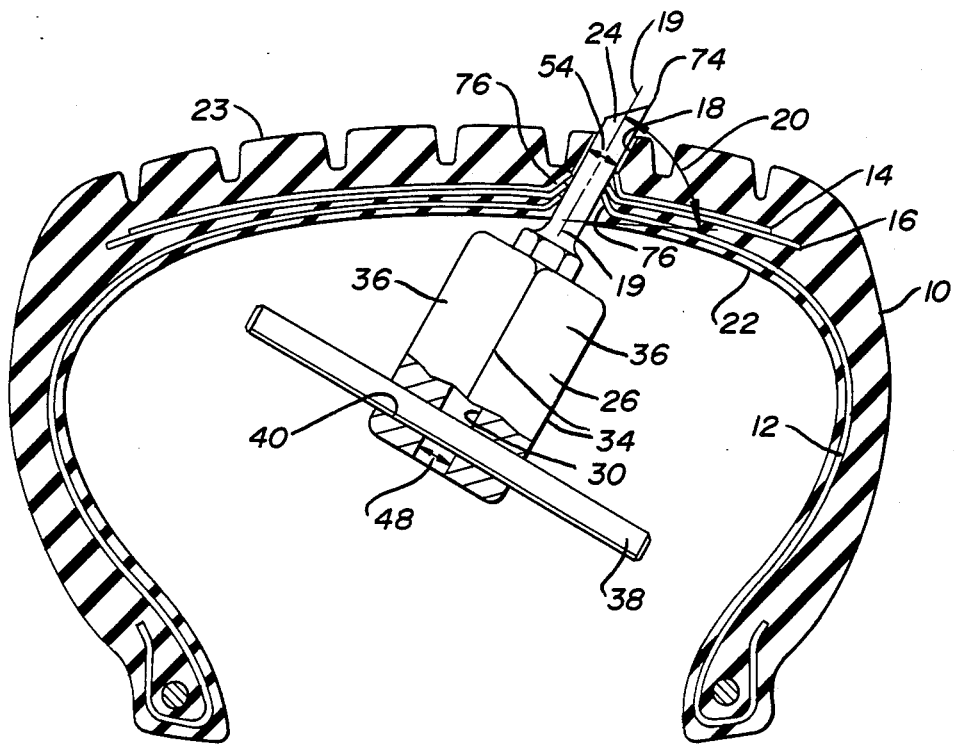
FIG. 1 is a cross-sectional view taken along a radial plane of a tire having a hole being repaired with an insert injecting tool having a tool tip inserted in the hole and the plunger removed so that a T-bar can be used to turn the tool, parts being broken away.

Referring to FIGS. 1 through 4, a tire 10 which may be a truck tire having reinforcing plies 12 of radially extending wires and belt plies 14 and 16 of generally circumferentially extending cords is shown. The tire 10 has an injury such as a hole 18 which may have been caused by penetration of a nail or other sharp object through the wall of the tire in the crown portion thereof. As shown in FIG. 1, axis 19 of the hole 18 is at an angle 20 to an inner surface 22 of the tire 10. The hole 18 also extends completely through the wall of the tire 10 from the inner surface 22 through an outer surface 23.

The tire 10 has been prepared for the system of repair embodying this invention by reaming the hole 18 with a suitable reaming tool such as a tapered drill or reamer which follows the direction of the injury. Referring to FIG. 1, a tool tip 24 mounted on a hollow tool 26 has been inserted in the hole 18 in the tire 10. As shown more clearly in FIG. 2, the tool tip 24 which may be of steel has a cylindrical compression chamber 28 connected to an insert receiving chamber 30 in the hollow tool 26 by a tapered reducing chamber 32.

In order to manually push the tool tip 24 into the hole 18 in the tire 10, the tool tip may be rotated by utilizing gripping means such as ribs 34 on the outer surface of the tool 26. The ribs 34 extend generally axially of the insert receiving chamber 30, and may be formed by machining hexagonal flats 36 on the outer surface of the tool 26. Further gripping may be provided by extending a bar 38 generally radially of the receiving chamber 30 through radially extending holes 40 in the body of the tool 26.

Figure 2:
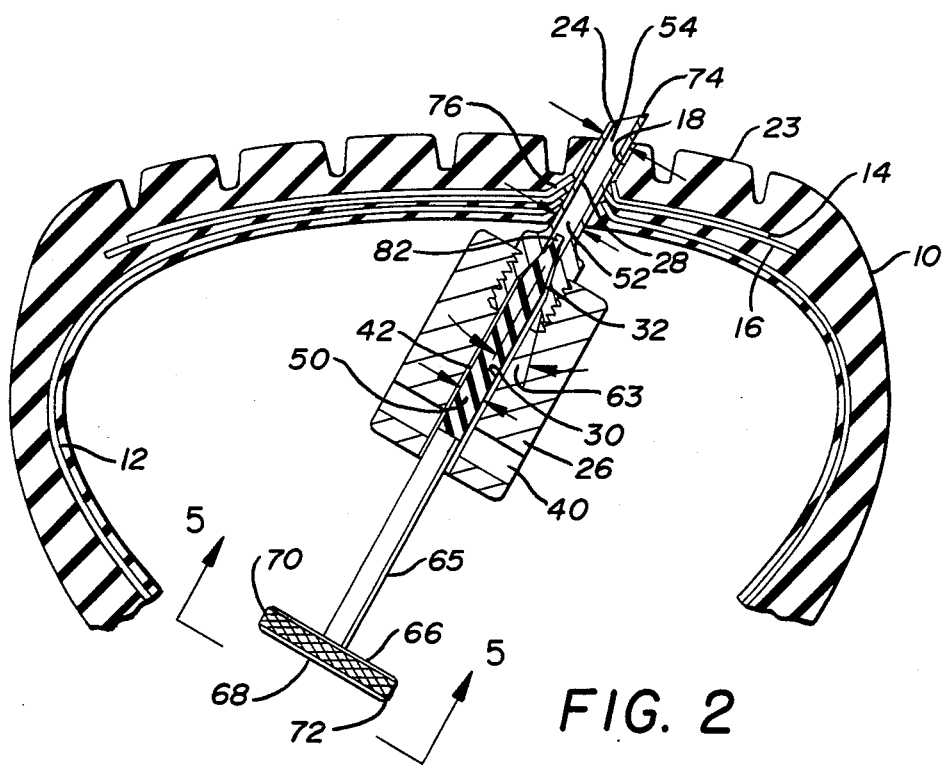
FIG. 2 is a half-sectional view showing the tool of FIG. 1 in section after insertion of the insert and plunger into the cylindrical chamber in the tool.

After the tool tip 24 has been rotated and pushed through the wall of the tire 10, the bar 38 may be removed and an elongated cylindrical insert 42 placed in the receiving chamber 30 as shown in FIG. 2. The insert 42, which is shown more clearly in FIG. 6, may be of a resilient material such as a body 44 of at least partially cured rubber which may be coated with an outer layer 46 of unvulcanized rubber such as a chemical cure gum. The receiving chamber 30 has a diameter 48 substantially the same as diameter 50 of the insert 42 for ease of inserting the insert into the receiving chamber. The compression chamber 28 in the tool tip 24 has a diameter 52 which is less than the diameter 50 of the insert 42. Outer diameter 54 of the tool tip 24 is less than the diameter 50 of the insert 42.

As shown in FIGS. 2 and 6, the insert 42 has a tapered portion 60 located at a forward end 62 of the insert. The tapered reducing chamber 32 has an angle of taper 63 which is greater than the angle of taper 64 of the tapered portion 60. In the embodiment shown, the angle of taper 63 of the tapered reducing chamber 32 is fifteen degrees and the angle of taper 64 of the tapered portion 60 is about ten degrees for an insert 42 having a diameter 50 of three-eighth inch (9.53 mm). With an insert 42 having a diameter 50 of one-quarter inch (6.35 mm), the angle of taper 64 of the tapered portion 60 may be around seven degrees.

Referring again to FIG. 2, a plunger 65 having a diameter substantially the same as the diameter 48 of the receiving chamber 30 is shown in an axially movable position in the receiving chamber for pushing the insert 42 out of the receiving chamber through the tapered reducing chamber 32 into the compression chamber 28 to a position such as that shown in FIG. 3. The plunger 65 has a diameter substantially the same as the diameter 50 of the insert 42 and includes a plunger head such as a disc 66 mounted on the end of the plunger for engagement by the hand of an operator. The disc 66 has a generally smooth flat surface 68 for pushing by the hand of the operator and a gripping edge such as knurled surface 70 to prevent slippage of the operator's hand off the flat surface. Beveled corners 72 at the knurled surface 70 may be provided on the disc 66 to prevent injury to the operator's hand.

As shown in FIG. 1, the tool tip 24 has an end 74 cut at an angle to provide a pointed edge for following the hole 18 as the tip is rotated and pushed into the hole. A lubricant such as a chemical cement like vulcanizing material for adhering the insert 42 to the tire 10 may be applied to the outer surface of the tool tip 24 prior to inserting it in the hole 18. Likewise this lubricant may be applied to the outer layer 46 of the insert 42 prior to placing it in the receiving chamber 30 of the hollow tool 26.

As shown in FIG. 3, the plunger 65 may be manually pushed to a position where the insert 42 is pushed through the compression chamber 28 a sufficient distance so that the forward end 62 extends beyond the end 74 of the tool tip 24. To remove the tool 26, the operator may manually rotate the tool tip 24 by gripping the ribs 34 and flats 36 on the outer surface of the tool. By removing the plunger 65 and inserting the bar 38 additional gripping of the tool 26 can be provided to rotate the tool.

The tool tip 24 is threaded in the hollow tool 26 with a thread of a predetermined hand so that if the tool is rotated in an opposite direction from the direction of rotation during insertion of the tool tip, the tool will be screwed off the tool tip and not rotate the tool tip. On the other hand, if the rotation is in the same direction as that used during insertion of the tool tip 24, the hollow tool 26 and tool tip will remain engaged. This is important in view of the fact that as the tool tip 24 is inserted in the tire 10, wire ends 76 of the plies 12, 14 and 16 will be urged radially outward and in a circular path around the hole 18. If the tool tip 24 is rotated in the same direction during removal from the tire 10, the wire ends 76 will remain in a circular configuration and not cut the insert 42 which remains in the hole 18 as shown in FIG. 4. It will also be seen that the wire ends 76 extend radially outward and therefore will not affect a patch applied to the inner surface 22 of the tire 10. After removal of the tool tip 24 from the hole 18, as shown in FIG. 4, the forward end 62 and rearward end 78 of the insert 42 may be cut off flush with the inner and outer surfaces 22 and 23. Curing of the gum of the layer 46 will also take place upon activation by the lubricant chemical cement like vulcanizing material. This adheres to the insert 42 to the walls of the hole 18.

As shown in FIG. 2, the hollow tool 26 has a length equal to at least length 80 of the insert 42 plus a distance sufficient to insert the plunger 65 in the insert receiving chamber 30. This provides a short tool 26 which can be manipulated with one hand from the inside of the tire 10.

The insert 42 has a guide plug 82 at the forward end 62. The guide plug 82 may have a diameter less than the diameter 50 of the insert 42 and less than the diameter 52 of the compression chamber 28 for guiding the insert into the compression chamber of the tool tip 24. The guide plug 82 is also useful for gripping the insert 42 during the process of dipping the insert to obtain the layer 46 of unvulcanized rubber.

With the system for repairing a tire 10 described hereinabove, the hole 18 in the tire 10 is sealed preventing water and air from reaching the wires of the plies 12, 14 and 16 which may cause rust and other deterioration. In accordance with practices well known to those skilled in the art, after the forward end 62 and rearward end 78 of the insert 42, shown in FIG. 4, are cut flush with the inner surface 22 and outer surface 23, a patch is applied to the inner surface to seal the inner liner of the tire 10 and provide a permanent repair.

Referring to FIG. 7, an insert 84 having a modified construction is shown. This insert 84 is like insert 42 shown in FIG. 6 except the body 44' has a recess 86 extending along the cylindrical portion from the rearward end 78' to the tapered portion 60'. A sheet 88 of unvulcanized rubber such as chemical cure gum is wrapped around the body 44' in the recess 86. A suitable cement may be applied to adhere the sheet 88 to the body 44'. At the forward edge of the recess 86, a shoulder 90 is provided so that when the insert 84 is pushed into the compression chamber 28 the sheet 88 will remain in place. In all other respects the insert 84 may be handled like the insert 42.

While a certain representative embodiment and details have been shown for the purpose of demonstrating the invention, it will be apparent to those skilled in the art that various changes and modifications may be made therein without departing from the spirit or scope of the invention.

We claim:

1. In a system for repairing a tire in which an elongated cylindrical insert of resilient material is positioned, under compression, in a hole extending from an inner surface to an outer surface of said tire, a tool tip containing a cylindrical compression chamber of lesser diameter than said insert, means for pushing said tool tip through said hole, means for pushing said insert into said compression chamber of said tool tip a sufficient distance so that a forward end of said insert extends beyond said end of said tool tip and beyond said outer surface of said tire, means for pulling said tool tip out of said hole leaving said insert in said hole and said insert having a cylindrical portion and a tapered portion located at said forward end for reducing the force necessary to push said insert into said compression chamber of said tool tip.

2. In the system according to claim 1, said insert having a recess along said cylindrical portion providing a shoulder at the forward edge and a sheet of unvulcanized rubber wrapped around said insert in said recess.

3. In the system according to claim 2, a lubricant comprising a chemical cement-like vulcanizing material for application to said sheet of unvulcanized rubber to lubricate said insert during movement into and through said compression chamber of said tool tip and for adhering said insert to said tire after removal of said tool tip from said hole in said tire.

4. In the system according to claim 1, said insert further comprising a guide plug at said forward end having a diameter less than the diameter of said insert and less than said diameter of said compression chamber for guiding said insert into said compression chamber of said tool tip.

5. In the system according to claim 1, said tool tip being mounted on a hollow tool containing a cylindrical insert receiving chamber having a diameter substantially the same as the diameter of said insert and said hollow tool comprising gripping means for manually rotating said hollow tool and said tool tip during pushing of said tool tip into said hole and pulling of said tool tip out of said hole.

6. In the system according to claim 5, said gripping means comprising ribs on an outer surface of said hollow tool extending generally axially of said cylindrical insert receiving chamber.

7. In the system according to claim 5, said gripping means comprising a bar extending generally radially of said cylindrical insert receiving chamber removably mounted in radial holes in the walls of said hollow tool.

8. In the system according to claim 5, said tool tip being in threaded engagement with said hollow tool for replacing said tool tip and for disengagement of said tool tip in the event said hollow tool is rotated in an opposite direction of rotation from the direction of rotation of said tool tip during pulling of said tool tip out of said hole.

9. In the system according to claim 5, said hollow tool further comprising a cylindrical plunger axially movable in said receiving chamber for pushing said insert out of said receiving chamber into said compression chamber, said plunger having a diameter substantially the same as the diameter of said insert, a plunger head mounted on one end of said plunger for manual movement of said plunger, and said plunger head comprising a disc with a generally smooth flat surface for pushing and a gripping edge for preventing slippage of the operator's hand off said flat surface of said disc.

10. In the system according to claim 5, a tapered reducing chamber connecting said insert receiving chamber and said cylindrical compression chamber in said tool tip and said tapered portion of said insert having an angle of taper less than the angle of taper of said tapered reducing chamber.

11. In the system according to claim 10, said angle of taper of said tapered portion of said insert being from about seven to ten degrees and said angle of taper of said reducing chamber about fifteen degrees.

12. In the system according to claim 9, said hollow tool having a length equal to at least the length of said insert.

* * * * *